United States Patent [19]

Tynan

[11] Patent Number: 5,550,322
[45] Date of Patent: Aug. 27, 1996

[54] ELECTRICAL OUTLET BOX

[76] Inventor: Joseph Tynan, 7 Brennan's Terrace, Strand Road, Bray, County Wicklow, Ireland

[21] Appl. No.: 211,756
[22] PCT Filed: Oct. 16, 1992
[86] PCT No.: PCT/IE92/00017
 § 371 Date: Aug. 5, 1994
 § 102(e) Date: Aug. 5, 1994
[87] PCT Pub. No.: WO93/08627
 PCT Pub. Date: Apr. 29, 1993

[30] Foreign Application Priority Data

Oct. 16, 1991 [IE] Ireland ................................. 3632/91

[51] Int. Cl.⁶ .................................................. H02G 3/08
[52] U.S. Cl. ................................ 174/48; 174/58; 220/3.6
[58] Field of Search ................ 174/48, 58; 220/3.2–3.6

[56] References Cited

U.S. PATENT DOCUMENTS 2,320,400  5/1941  Bedell ........................................ 220/3.6
2,357,787  6/1941  Windsheimer ............................ 220/3.3
3,966,152  6/1976  Bromberg ................................. 248/27 R
4,000,874  6/1977  Finley et al. ............................. 248/27.1
4,297,525  10/1981 Bowden, Jr. .............................. 174/58

FOREIGN PATENT DOCUMENTS 2582457  11/1986  France .
2170660  8/1986   United Kingdom .

Primary Examiner—Kristine L. Kincaid
Assistant Examiner—Michael J. Cornelison
Attorney, Agent, or Firm—Lahive & Cockfield

[57] ABSTRACT

An electrical outlet box, for mounting in an opening of a panel, includes holding members that are rotatably and slidably mounted upon a cylindrical pin fixed to the base of the housing and extending towards the open front thereof. The holding members are rotatable from an inoperative position wherein the holding member is substantially inside the housing to an operative position wherein the holding member projects through an aperture in the housing sidewall. Each holding member is slidable forwardly upon its respective pin to bear against the back side of the panel. Retention elements allow forward movement of the holding member but resist rearward movement, and guide elements guide the holding member during forward movement.

8 Claims, 2 Drawing Sheets

ELECTRICAL OUTLET BOX

TECHNICAL FIELD

The present invention relates to improvements in electrical outlet boxes.

SUMMARY OF THE INVENTION

According to the invention there is provided an electrical box for mounting in an opening of a panel, including a housing having a base and sidewall(s) defining an open front to the housing with means at said open front for bearing against the surface of the panel surrounding the opening, the electrical outlet box further including at least two holding members in the housing each rotatable about a respective axis extending in the front to rear direction of the housing and each having a retaining flange extending sideways relative to the axis of rotation of the member, each member being rotatable about the respective axis from an inoperative position wherein the respective retaining flange is substantially inside the housing to an operative position wherein the retaining flange projects through a respective aperture in the housing sidewall, the holding member being slidable forwardly towards the open front of the housing when in the operative position.

DETAILED DESCRIPTION OF THE INVENTION

Figure 1:
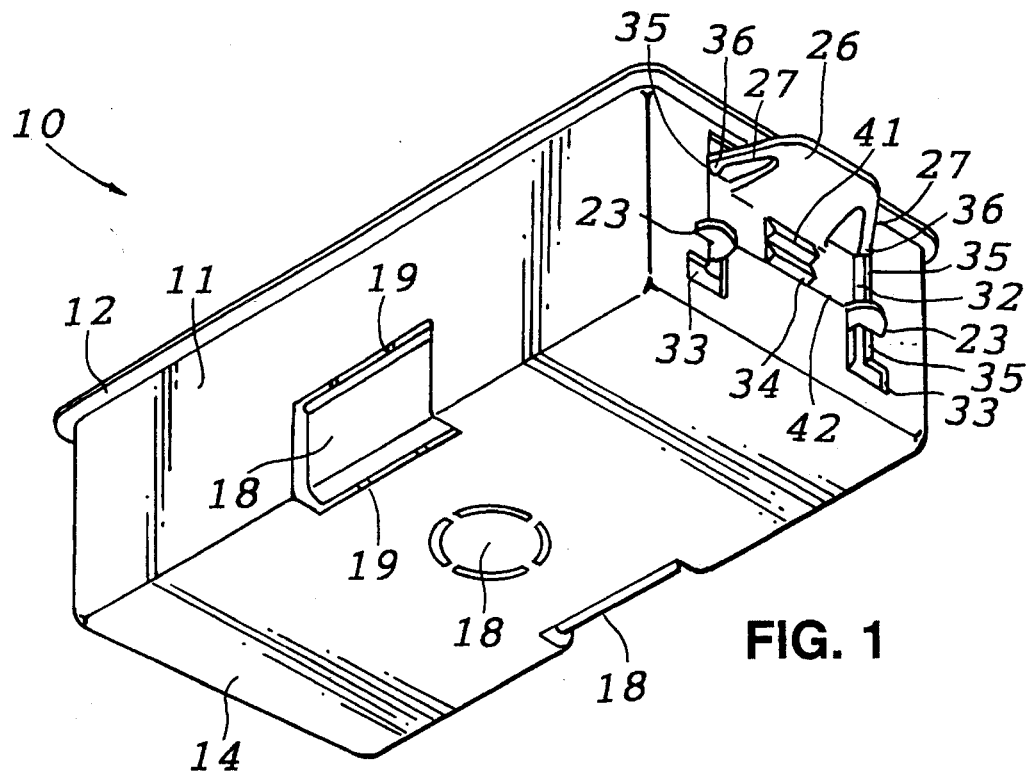
FIG. 1 is a rear perspective view of an electrical outlet box according to the embodiment of the invention.

An embodiment of the invention will now be described, by way of example, with reference to the accompanying drawings.

Referring now to the drawings wherein similar numerals have been used to indicate like parts, there is shown therein an electrical outlet box generally indicated at 10 according to the invention.

The electrical outlet box 10 comprises a rectangular housing 11 formed of plastics or other suitable material. The housing 11 has a rear wall or base 14 and sidewalls 15 which define an open front 16 to the housing, the latter having a peripheral out-turned flange 12 which in use of the dry lining box bears against the surface of a panel in which the housing 11 is inserted. The rear wall 14 and the two longer ones of the sidewalls 15 are provided with "press out" regions 18 which are attached to the housing proper by means of a number of thin walled integral projections 19 which are easily broken to enable the regions 18 to be removed to provide apertures through which electrical cables may be inserted into the interior of the housing 11.

The housing 11 is provided with two holding members 20, which are rotatably mounted on respective cylindrical pins 30, which are integrally formed on the rear wall 14 of the housing 11 close to two diagonally opposed corners 31. Each holding member 20 is rotatable on its respective pin 30 through approximately 90 degrees about an axis extending in the front to rear direction of the housing 11, that is to say, in the case of the present embodiment, about an axis at least approximately perpendicular to a plane containing the open front 16 of the housing 11. Further, the axes of rotation of the two holding members 20 are themselves substantially parallel.

Each holding member 20, comprises a body portion 21 having a hollow cylindrical end 22 which engages over the respective cylindrical pin 30. A pair of oppositely directed hook-like guide members 23, are formed on the body portion 21 and include a first part 24 which projects outwardly from the body portion and a second part 25, which projects at right angles to the first part 24, the two parts 25 extending in mutually opposite directions. Each holding member 20 further comprises a retaining flange or ear 26 which extends sideways relative to the axis of rotation of the member 20, i.e. approximately parallel to the plane containing the open front 16 of the housing. Each flange 26 has two resilient arms 27 which diverge from its free end back towards the body portion 21. The body portion 21 is also formed on its side opposite the flange 26 with a generally centrally disposed hollow cylindrical stock 28 which is internally screw-threaded to receive a screw as will be described below.

Further, the cylindrical end 22 is formed with an external protrusion 29 the purpose of which will be described below.

The two opposite shorter sidewalls 15 of the housing are each provided with an aperture 32 which is generally rectangular, but which also includes two right angled slots 33, defined by a wall flange 34. Each aperture 32 has opposite edges 35 which are substantially parallel to the axis of rotation of the holding members 20 about the pins 30. As will be described, each edge 35 serves as a linear guide for a respective hook-like guide member 23. These edges 35 are bevelled and taper (converge) from the outside surface towards the inside surface of the wall 15.

Figure 4:
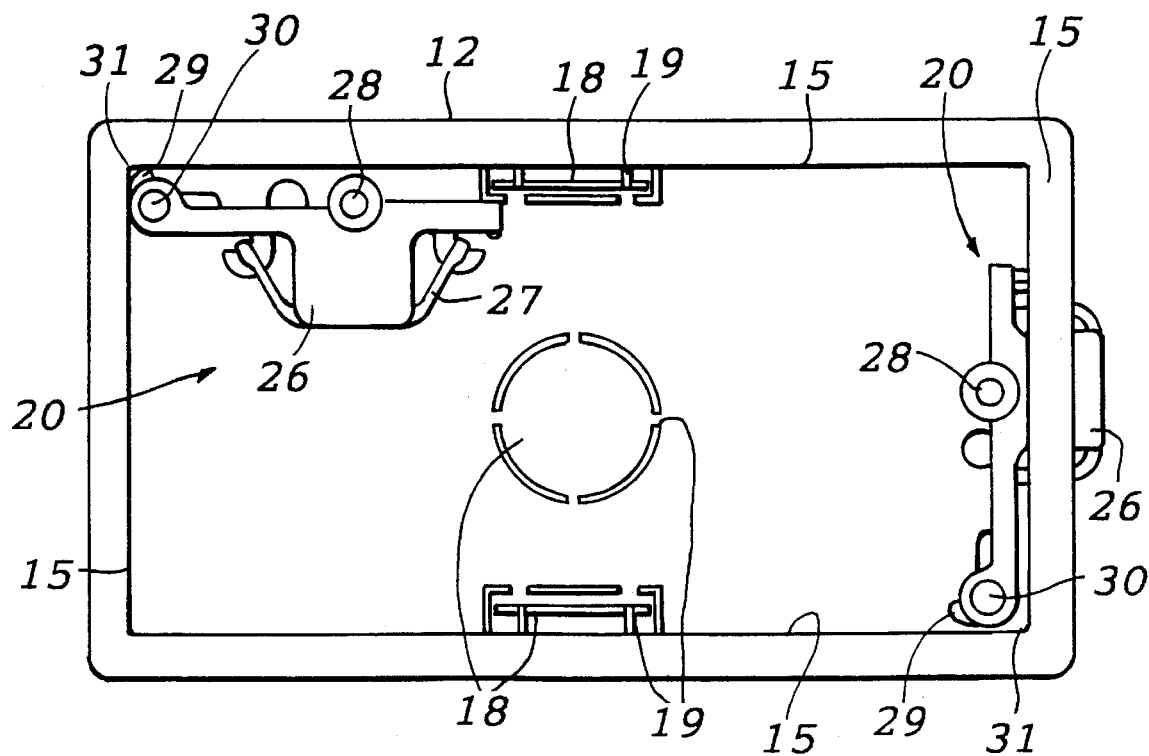
FIG. 4 is a front elevation of the electrical outlet box of FIG. 1.

Each holding member 20 is rotatable about its respective pin 30 from an inoperative position wherein the respective retaining flange 26 is inside the housing (see member 20 at the top left hand side in FIG. 4) to an operative position wherein the retaining flange 26 projects through the respective aperture 32 in the housing sidewall 15 (see member 20 at right hand side in FIG. 4). When in the inoperative position the protrusion 29 bears against the inside surface of the adjacent wall 15 so that the holding member is firmly held in this position and this bearing force must be manually overcome to move the member to the operative position as will now be described.

To move it from its inoperative position to its operative position the holding member 20 is rotated clockwise about its pin 30 towards the respective aperture 32, initially to a position in which lips 36 at the end of each resilient arm 27 engage on the inside of the housing 11 with the edges 35 of the aperture 32. At this point a greater force must be used to compress the arms 27 slightly towards one another to enable the arms 27 to pass through the aperture 32 and permit the holding member 20 to be pushed fully home to its operative position, as shown for the right hand member 20 in FIG. 4. In the fully home operative position the lips 36 on the free ends of the arms 27 now bear resiliently against the bevelled edges 35 of the aperture 32, and the guide members 23, project through the right-angled lower ends of slots 33. In this position the holding members 20 may be slid forward towards the front 16 of the housing 11.

During such forward sliding movement the hook-like guide members 23, which were brought into alignment with the edges 35 by the rotation of the member 20 into the operative position, engage the opposite edges 35 of the aperture 32, see FIG. 1. Thus the member 20 is stablised during the forward sliding movement by the guide members 23 near the bottom and the arms 27 at the top, which both engage the edges 35 of the aperture 32. Further, the positive engagement of the hooks 23 with the edges 35 prevent the holding member 20 from being inadvertently rotated back into the housing 11 when in a forward position.

Figure 2:
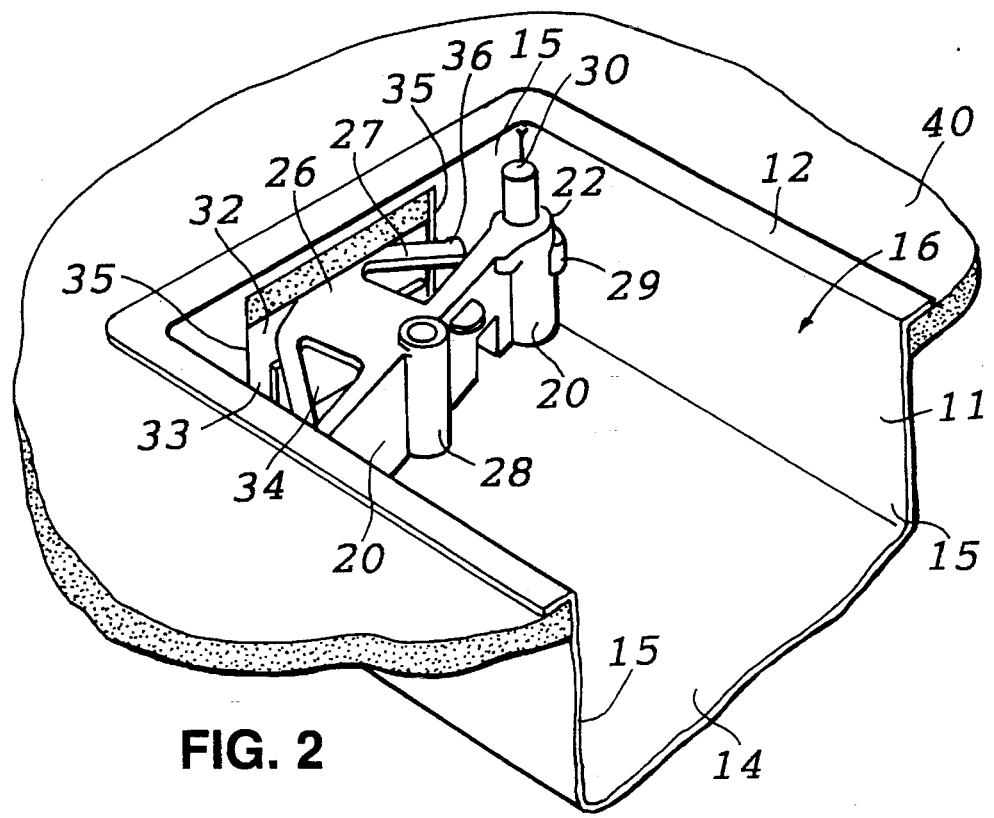
FIG. 2 is a cut-a-way front perspective view of the electrical outlet box of FIG. 1 mounted on a wall.
Figure 3:
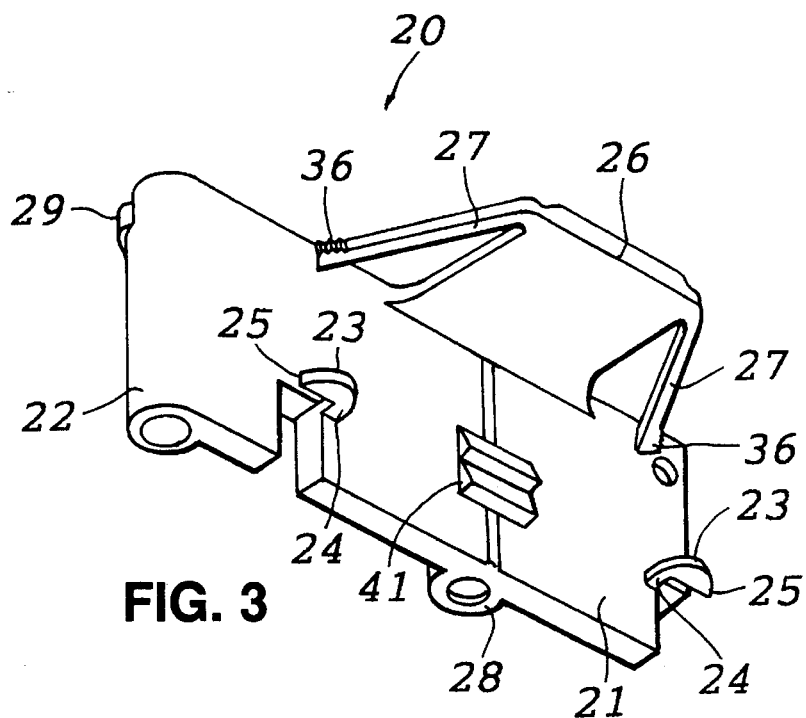
FIG. 3 is a perspective view of a holding member according to the embodiment of the invention.

In use, the electrical outlet box 10 is fitted to structure, for example a "stud wall" 40 as generally indicated in FIG. 2. The electrical outlet box 10 provides a housing for accommodating an electrical socket into which a plug from an electrical appliance may be inserted. A stud wall normally comprises two panels of, for example, plasterboard which are secured together by means of wooden laths which are spaced apart, so that the wall is essentially hollow.

In order to fit the electrical outlet box 10 into the stud-wall, a rectangular aperture (not shown) is cut in the panel 40 which is of a size of approximately that of the housing 11.

The housing 11 is then inserted into the aperture in the panel 40 with the holding members 20 in their non-operative positions and the two holding members 20 are then rotated to their operative position. The holding members are then moved forward so that the flange 12 abuts the front surface of the panel 40 and the locking flange 26 abuts the rear surface of the panel 40.

A conventional electrical socket (not shown) is mounted in the housing 11 and is connected to electrical cables which enter the housing through the apertures formed when the flanges 18 are removed. A cover plate (not shown) is then located on the front of the housing 11, and screws engage in the stock 28 from the cover plate. As the screws are tightened, the holding members 20, 20' are pulled forward so that the locking flange 26 securely grips the rear surface of the panel 40, and the flange 12 grips the front surface of the panel 12.

Clearly, while the fitter is attempting to locate the screws in the stocks 28, there is a possibility that the holding element 20 as a whole may be pushed back rearwardly into the housing 11 once again, out of reach of the screw. To prevent this, the body portion 21 of each holding member 20 is provided on its outer surface with two rearward facing wedge-shaped projections 41. As the holding element 20 is slid forward (upwards in FIG. 1) these projections 41 will "ratchet" across the free edge 42 of the flange 34, and resist the holding member 20 sliding back in the rearward direction beyond a certain point. However, because of the direction of angle of the projections 41 they do permit forward sliding movement of the holding member. Of course, the holding member 20 can be pushed fully back by slight deformation of the holding member 20 and/or the flange 34 so that the edge 42 of the flange 34 clears the projections 41.

In order to remove the electrical outlet box 10 from the panel 40, the cover plate must be removed and the holding members 20, 20' moved to their non-use position inside the housing 11 so that the locking flanges 26 no longer grip the panel 40.

What is claimed is:

1. An electrical outlet box for mounting in an opening of a panel, including a housing having a base and sidewall(s) defining an open front to the housing with means at said open front for bearing against the surface of the panel surrounding the opening, the electrical outlet box further including at least two holding members in the housing each comprising a body portion rotatably mounted upon a respective cylindrical pin fixed to the base of the housing and extending towards the open front thereof and a retaining flange extending sideways from the body substantially parallel to the open front of the housing, each member being rotatable about the axis of the respective pin from an inoperative position wherein the respective retaining flange is substantially inside the housing to an operative position wherein the retaining flange projects through a respective aperture in the housing sidewall, each holding member being slidable forwardly on its respective pin towards the open front of the housing when in the operative position.

2. An electrical outlet box as claimed in claim 1, wherein the housing has a linear guide which is substantially parallel to the axis of rotation of its respective holding member, and each of the holding member has a guide means which is brought into alignment with the linear guide by rotation of the member into the operative position and which engages the linear guide during forward sliding of the member.

3. An electrical outlet box as claimed in claim 2, wherein the linear guide comprises an edge of the respective aperture and wherein the guide means comprises a hook.

4. An electrical outlet box as claimed in claim 3, wherein each holding member has means for cooperation with the housing which permits forward sliding movement of the member but resists rearward sliding movement of the member.

5. An electrical outlet box as claimed in claim 4, wherein the means for cooperation comprises at least one wedge-shaped projection which cooperates with said edge of the respective aperture.

6. An electrical outlet box as claimed in claim 1, wherein the housing is substantially rectangular, the apertures are provided in respective opposite sidewalls of the housing and the pins are located adjacent opposite diagonal corners of the housing, wherein each of the holding members may be rotated from the inoperable position, wherein the body portion lies along the inside surface of the respective sidewall at a right angle to one of the other sidewalls containing one of the apertures, to the operative position, wherein the body portion lies along the inside surface of one of the respective sidewalls containing one of the aperture with the flange projecting through said one of the apertures.

7. An electrical outlet box as claimed in claim 6 wherein each holding member has a pair of mutually outwardly directed hooks on the same side of the body portion as the flange, and wherein each aperture has opposite parallel edges which are substantially perpendicular to the open front of the housing but spaced apart less than the distance between the furthest extremities of the hooks, each aperture further having mutually outwardly directed portions remote from the open front of the housing to permit the hooks to pass through said one of the respective sidewalls containing said one of the apertures when the member is rotated from the inoperative position to the operative position with the hooks aligned with the outwardly directed portions, the hooks engaging the parallel edges of the respective aperture during forward sliding of the member.

8. An electrical outlet box as claimed in claim 7, wherein each holding member has at least one wedge-shaped projection on the same side of the body as the flange and the at least one projection cooperates with a lower edge of the respective aperture to permit forward sliding movement of the member but resist rearward sliding of the member.

* * * * *